UNITED STATES PATENT OFFICE.

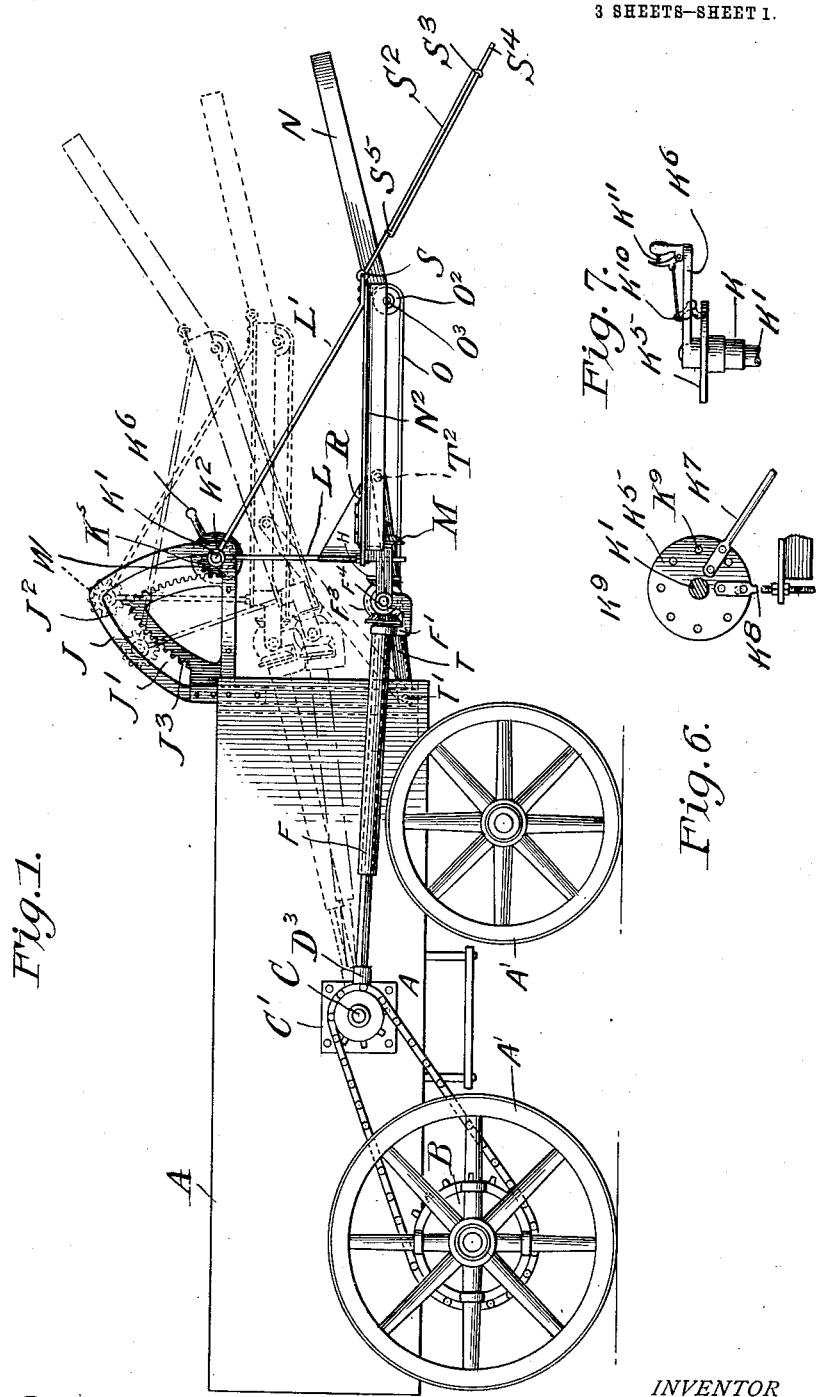

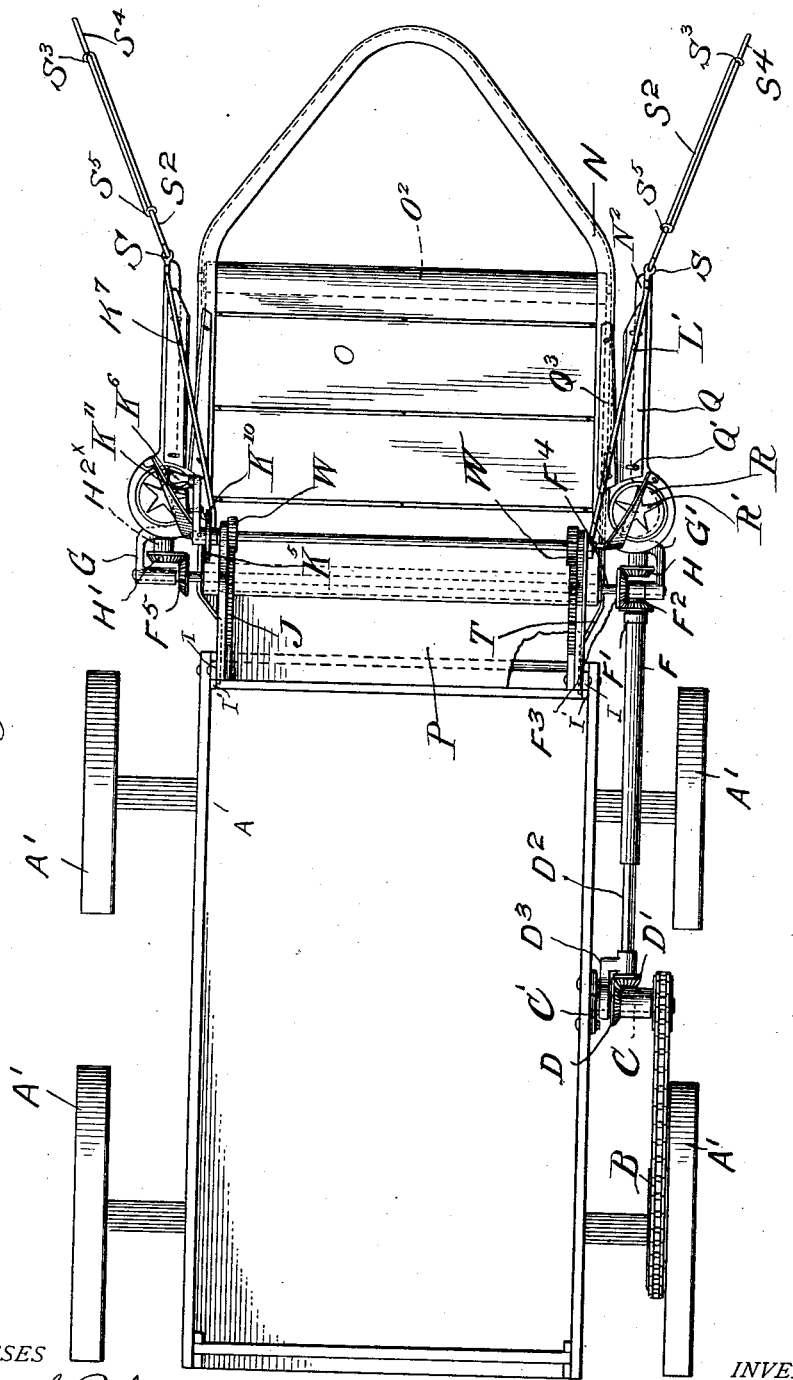

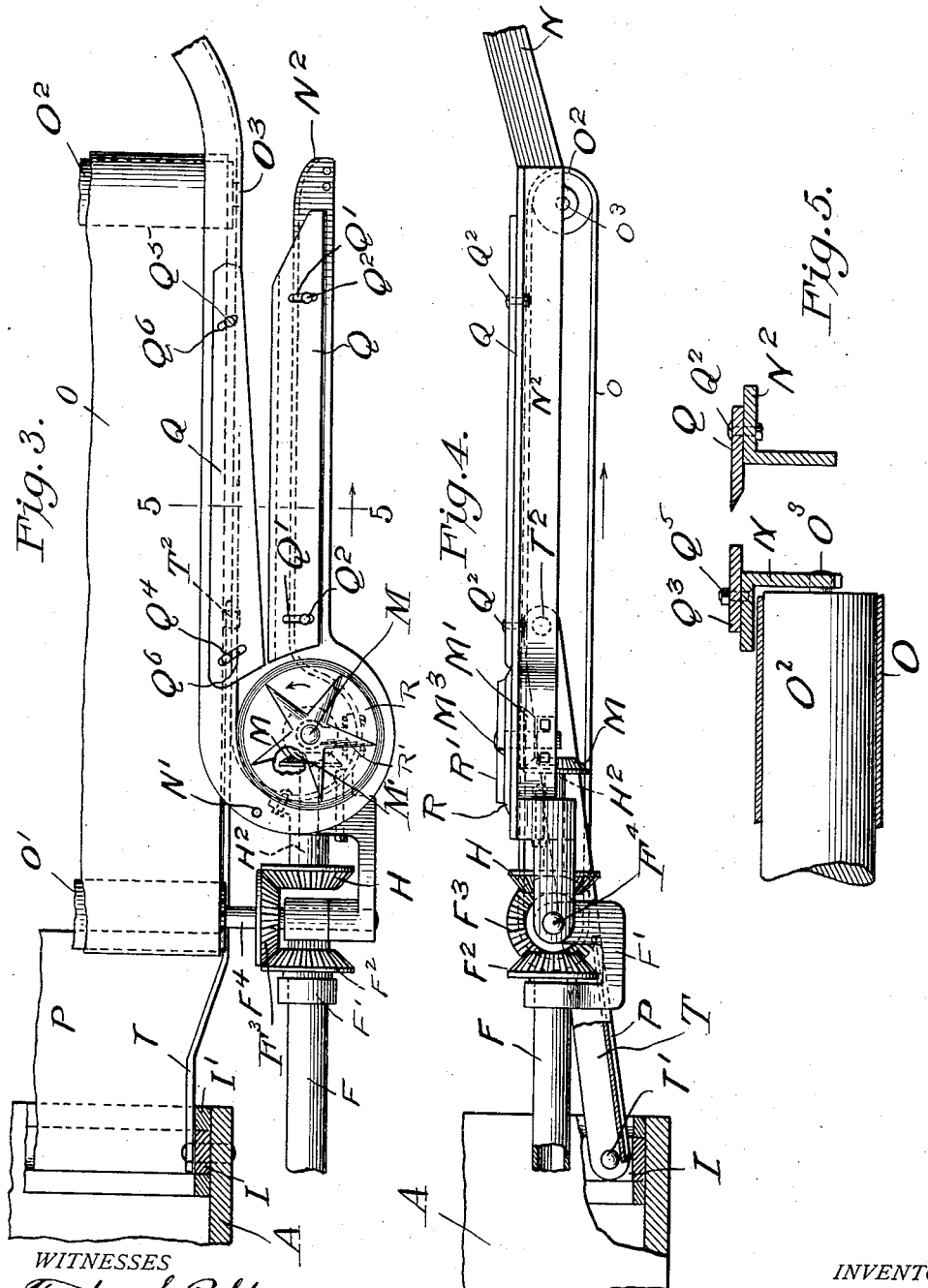

THOMAS H. SPARKS, OF WICHITA, KANSAS.

APPARATUS FOR CUTTING KAFIR CORN, CANE, &c.

1,033,631.

Specification of Letters Patent. Patented July 23, 1912.

Application filed January 18, 1912. Serial No. 671,898.

*To all whom it may concern:*

Be it known that I, THOMAS H. SPARKS, a citizen of the United States, residing at Wichita, in the county of Sedgwick and State of Kansas, have invented certain new and useful Improvements in Apparatus for Cutting Kafir Corn, Cane, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus for heading Kafir corn and stalks of various kinds and the object in view is to produce a simple and efficient apparatus of this nature so arranged that two rows may be cut at the same time.

The invention consists more specifically in the provision of a stalk cutting mechanism adapted to be mounted upon a wagon box and held in different adjusted positions.

The invention comprises various details of construction and combinations and arrangements of parts which will be hereinafter fully described, shown in the accompanying drawings and then specifically defined in the appended claims.

I illustrate my invention in the accompanying drawings, in which:—

Figure 1 is a side elevation of my improved stalk cutting apparatus. Fig. 2 is a top plan view. Fig. 3 is an enlarged top plan view, partly in section. Fig. 4 is a side elevation. Fig. 5 is a sectional view on line 5—5 of Fig. 3. Fig. 6 is a detail sectional view showing parts in elevation, and Fig. 7 is a top plan view of the construction shown in Fig. 6.

Reference now being had to the details of the drawings by letter, A designates a wagon box mounted upon a suitable truck with wheels A'. Fixed to the rear axle is a sprocket wheel B, and C is a stub axle, shown in top plan view in Fig. 2 of the drawings, upon a plate C' and fixed to said stub shaft is a beveled gear wheel D which is in mesh with a similar beveled gear wheel D' rotating with the shaft $D^2$, which latter has a yoke $D^3$ thereon supported upon the shaft C. Said shaft $D^2$ is preferably angular in cross section and adapted to telescope within the shaft F, which latter is mounted in suitable bearings in the yoke F'. A gear wheel $F^2$ is fixed to the hollow shaft F and is in mesh with a beveled gear $F^3$ which is fixed to the shaft $F^4$, which has bearings in the two yokes F' and G. Upon the opposite end of the shaft $F^4$, which is journaled in a bracket member G, is fixed a similar beveled gear wheel $F^5$, and H and H' designate beveled gear wheels, the former of which is in mesh with the gear wheel $F^3$ and the latter with the gear wheel $F^5$. The beveled gear wheel H is mounted upon a stub shaft $H^2$ and the beveled wheel H' is mounted on a similar stub shaft $H^{2x}$ upon the opposite side.

I, I designate two standards which are slidingly held between the cleats I' upon the opposite sides of the wagon box in the space ordinarily occupied by the end board and as shown clearly in Fig. 3 of the drawings. Said standards support the inverted V-shaped rack member J which has a slot J' therein, one edge $J^2$ of which is without teeth and against which an anti-friction roller K, shown in Fig. 7 of the drawings and which is mounted upon a shaft K', is adapted to bear, as the shaft K' is raised and lowered in the manner which will be presently described. Said shaft K' is supported in the slot of the segment member J and has journaled thereon at one end a collar $K^2$, shown in Fig. 1 of the drawings, which collar has fastened thereto two rods L and L', the lower end of the rod L being threaded and extending through an aperture N' in the angle bar N, which latter is bow-shaped, as shown in Fig. 2 of the drawings, and has its end bent upon itself as at $N^2$ (Figs. 2 and 3 of the drawings), forming an arm which is spaced apart from the shank portion which supports the endless carrier O, the latter passing about the rollers O' and $O^2$. Said roller O' is fixed to the shaft $F^4$ and roller $O^2$ has spindle ends $O^3$, having bearings in the angle bar N, as shown.

Mounted upon the upper surface of the arm $N^2$ is a cutting knife Q, having transverse slots Q' through which bolts $Q^2$ pass, providing for an adjustment of said knife upon the flat upper surface of said arm $N^2$. It will be noted upon reference to Fig. 5 of the drawings that the edge of the blade Q is undercut and opposite said blade and upon the angle bar N is a laterally adjustable plate $Q^3$, which is set with its blunt edge positioned preferably at an angle to the cutting edge of the knife or blade Q, lateral adjustment being made possible through the medium of the bolts $Q^4$ and $Q^5$ which pass through the diagonally disposed slots $Q^6$.

Fixed to the end of the shaft $H^2$ is a beveled gear M which is in mesh with a similar beveled gear wheel M' mounted upon the vertically disposed stub shaft $M^3$, which latter is provided with a circular-outlined cutting disk R, rotatable upon the upper flat surface of the angle bar N, and ribs R', which taper to points, project from the upper surface of said circular cutting disk and the corresponding edge of each rib is at right angles to the face of the disk and provided for the purpose of causing any stalks which might happen to fall over upon the disk to be thrown by said ribs toward the conveyer.

It will be noted upon reference to Fig. 2 of the drawings that each side of the conveyer is provided with similar cutting knives, similarly mounted and operated through the medium of the beveled gear wheels H and H'. Bars designated by letter T are pivotally connected at T' to the cleats I and their forward ends are pivotally connected at $T^2$ to said angle bar N at positions opposite each other and form means for supporting the angle bar. The platform P is secured to said bar and extends forward to the position underneath the roller O', as shown clearly in Fig. 3 of the drawings.

A disk $K^5$ is loosely mounted upon the shaft K' at the end opposite the collar $K^2$, shown clearly in Fig. 6 of the drawings, and a suitable handle $K^6$ is fixed to the shaft K' and affords means for rotating the latter. The upper ends of the bars $K^7$ and $K^8$ are fastened to said disk and the lower ends to the angle bar upon the left side of the apparatus, shown in Fig. 2 of the drawings. The disk $K^5$ is provided with apertures $K^9$ and a pawl $K^{10}$ is pivotally mounted upon the handle and adapted to be actuated by the spring-pressed latch lever $K^{11}$ to cause the end of the pawl to engage one or another of the apertures $K^9$. Gear wheels W are mounted upon the shaft K' and are adapted to engage the teeth $J^3$ formed on the V-shaped rack bar J opposite the straight edge $J^2$ thereof.

Pivotally mounted in eyes S formed in the lower ends of the braces L' and $K^7$ are rods $S^2$, each having an eye $S^3$ at its end through which a second rod $S^4$ passes and which rod $S^4$ has an eye $S^5$ movable upon the rod $S^2$, the rods $S^2$ and $S^4$ serving to guide any stalks to be cut toward the cutting knives.

The operation of my invention will be readily understood and is as follows:—The parts being adjusted as shown in Figs. 1 and 2 of the drawings, as the wagon is driven over the ground, a rotary movement will be imparted to the shaft F which will cause the endless conveyer to travel in the direction indicated by the arrow in Fig. 4. The wagon is so driven that the spaces between the knives Q and the adjacent plates $Q^3$ will come in alinement with the row of stalks to be cut. As the apparatus moves forward, the obliquely disposed edge of the plate $Q^3$ will cause the stalks to be thrown against the beveled cutting edge of the knife or blade Q and severed. Any stalks which might pass the knife uncut and come in contact with the rotatable cutting disk R will be completely severed, said cutting disk being rotated by the gear connections shown and the radial ribs upon the cutting disk will tend to throw the severed tops of the stalks upon the endless conveyer and, as the latter moves rearward, the stalks will be deposited upon the platform P. As the stalks come in contact with the rods $S^2$ and the obliquely disposed portions of the angle bar N, they will be guided into the spaces intermediate the knives and the adjacent plates $Q^3$.

By the manipulation of the handle $K^6$, the carrier may be raised from the position shown in full lines in Fig. 1 to the horizontal position shown in dotted lines and, by continuing the movement of the pinion W to the rearward portion of the rack member, the carrier may be tilted to the position shown in dot and dash lines.

What I claim to be new is:—

1. An apparatus for heading Kafir corn, etc., comprising, in combination with a wagon box, inverted, V-shaped, stationary rack members mounted thereon, an angle bar, a conveyer mounted upon the latter, means for operating the conveyer, cutting knives upon the angle bar, a shaft supported in said rack members, collars in which said shaft is mounted, and connections between said collars and angle bar whereby, as said shaft is rotated, the conveyer may be adjusted vertically, as set forth.

2. An apparatus for heading Kafir corn, etc., comprising, in combination with a wagon box, fixed inverted, V-shaped rack members having registering slots therein, the inner edge of each slot having teeth formed therein, a shaft mounted in said slots, gear wheels fixed to the shaft and having teeth engaging the teeth upon the edges of the slots, means for rotating the shaft, collars in which the shaft is mounted, a conveyer frame and conveyer therein, means for operating the latter, and hangers connected to the collars for supporting the frame, as set forth.

3. An apparatus for heading Kafir corn, etc., comprising, in combination with a wagon box, fixed inverted V-shaped rack members having registering slots therein, the inner edge of each slot having teeth formed therein, a shaft mounted in said slots, collars in which the shaft is journaled, gear wheels fixed to the shaft and having teeth engaging the teeth upon the edges of the slots, anti-friction rollers upon said shaft and bearing against the outer marginal edges of said slots and adapted to hold the gear wheels in mesh with the teeth of the rack members, an angle bar, hangers connected to said collars for supporting said bar, a conveyer mounted upon the latter, and means for operating the conveyer, as set forth.

4. An apparatus for heading Kafir corn, etc., comprising, in combination with a wagon box, fixed inverted, V-shaped rack members having registering slots therein, the inner edge of each slot having teeth formed therein, a shaft mounted in said slots, gear wheels fixed to the shaft and having teeth engaging the teeth upon the edges of the slots, means for holding the gear wheels in mesh with the teeth of the rack members, a disk fixed to said shaft, a handle upon the disk, an angle bar, a conveyer upon the latter, collars in which the shaft is mounted, hangers connected to the collars and supporting said angle bar, and means carried by the handle and adapted to engage said disk to hold the shaft and conveyer in different adjusted positions, as set forth.

5. An apparatus for heading Kafir corn, etc., comprising, in combination with a wagon box, having vertical cleats thereon spaced apart, inverted, V-shaped rack members, standards fixed thereto and movable between said cleats, an angle bar, a conveyer mounted upon the latter, means for operating the conveyer, cutting knives upon the angle bar, a shaft supported in said rack members, collars in which said shaft is mounted, and connections between said collars and angle bar whereby, as said shaft is rotated, the conveyer may be adjusted vertically, as set forth.

6. An apparatus for heading Kafir corn, etc., comprising a vertically adjustable, endless conveyer, means for driving the latter, a curved angle bar supporting said conveyer and adapted to guide the stalks to be cut, each end of said curved angle bar bent upon itself to form a knife supporting arm, laterally adjustable knives mounted one upon each of said arms, adjustable plates upon said bar and each having its outer edge at an inclination to the cutting knife, a rotatable, circular-outlined cutting knife mounted upon each angle bar, and means movable with the rotatable knife for removing the tops of the corn laterally as they are severed from the stalks, as set forth.

7. An apparatus for heading Kafir corn, etc., comprising a vertically adjustable, endless conveyer, means for driving the latter, a curved angle bar supporting said conveyer and adapted to guide the stalks to be cut, each end of said curved angle bar bent upon itself to form a knife, supporting arm, laterally adjustable knives mounted one upon each of said arms, adjustable plates upon said bar and each having its outer edge at an inclination to the cutting knife, a rotatable, circular-outlined cutting knife mounted upon each angle bar, and ribs rising from the upper surface of the rotary cutting knives and adapted to move the severed butt ends of the heads of the stalks toward the endless conveyer, as set forth.

In testimony whereof I hereunto affix my signature in the presence of two witnesses.

THOMAS H. SPARKS.

Witnesses:
A. L. HOUGH,
A. R. FOWLER.

Copies of this patent may be obtained for five cents each, by addressing the "Commissioner of Patents, Washington, D. C."